United States Patent
Sen et al.

(10) Patent No.: US 8,633,956 B2
(45) Date of Patent: Jan. 21, 2014

(54) PATTERNING OF COATED PRINTED MEDIA

(75) Inventors: Radha Sen, Glendale, CA (US); Ali Emamjomeh, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 88 days.

(21) Appl. No.: 13/224,109

(22) Filed: Sep. 1, 2011

(65) Prior Publication Data

US 2013/0057637 A1    Mar. 7, 2013

(51) Int. Cl.
*B41J 2/435* (2006.01)
*B41J 2/47* (2006.01)

(52) U.S. Cl.
USPC .......................... 347/224; 347/225

(58) Field of Classification Search
USPC .................. 347/224, 225; 101/453, 460
See application file for complete search history.

(56) References Cited

U.S. PATENT DOCUMENTS

| | | | |
|---|---|---|---|
| 5,830,529 A | 11/1998 | Ross | |
| 6,323,456 B1* | 11/2001 | Murthy et al. | 219/121.71 |
| 7,438,323 B2 | 10/2008 | Lowry et al. | |
| 7,503,483 B2 | 3/2009 | Buck et al. | |
| 2005/0163415 A1 | 7/2005 | Moynihan et al. | |
| 2006/0098933 A1* | 5/2006 | Shelnut et al. | 385/145 |
| 2007/0190452 A1* | 8/2007 | Kimelblat et al. | 430/270.1 |
| 2008/0085385 A1 | 4/2008 | Ylitalo et al. | |
| 2010/0021672 A1 | 1/2010 | Prizzi et al. | |

FOREIGN PATENT DOCUMENTS

JP    04078842 A  *  3/1992

OTHER PUBLICATIONS

Bargon, Joachim et al., Laser or Flood Exposure Generated Electrically Conducting Patterns in Polymers, MRS Proceedings (Online Proceedings Library), 1992, pp. 47-52, 274; doi:10.1557/PROC-274-47.

* cited by examiner

*Primary Examiner* — Hai C Pham

(57) ABSTRACT

A pattern is provided in coated printed media by flood coating a printed media with an overcoat material that hardens to form an overcoat coating and by controllably removing a portion of the overcoat coating from the printed media in a predetermined region with laser ablation. The printed media in the ablated region remains substantially intact. The ablated predetermined region provides the pattern in the coated printed media.

20 Claims, 4 Drawing Sheets

PATTERNING OF COATED PRINTED MEDIA

CROSS-REFERENCE TO RELATED APPLICATIONS

N/A

STATEMENT REGARDING FEDERALLY SPONSORED RESEARCH DEVELOPMENT

N/A

BACKGROUND

Printing techniques can be broadly categorized into two groups: analog and digital. Common analog techniques are offset lithography, and flexographic, gravure and screen printing. Inkjet and electrophotographic printing are the most prevalent digital technologies. Digital printing has an advantage over its analog counterpart in that printed output can be digitally altered, meaning that every printed page can be different. To change the printed output of an analog printer, a new set of imaging plates or stencils must be produced. Digital printing methods are more cost effective at low run lengths (number of pages), whereas at large page counts analog printing may be more economical. Print quality is another vector of comparison between printing methods. Analog prints may have superior image quality and may operate at higher printing speeds than digital printing methods, where their use depends on the print job or application.

Since the mid-1980s electrophotographic (EP) printing, commonly known as laser printing, has been a popular choice among consumers who demand high quality, professional looking printed communications. State-of-the-art commercial EP printers now have image quality that rivals lithographic offset printers, although printing speed and cost may still favor analog printers for many print jobs. Dry EP or DEP employs dry toner particles. Liquid electrophotographic (LEP) printing is a variant of EP printing that has superior image quality and the advantage of being compatible with a broad substrate gamut (coated and uncoated paper, plastic sheet, cardboard, folded cartons, shrink wrap and labels, for example). LEP ink uses a dielectric carrier fluid and pigmented resin as colorant particles. Electrophoretic attraction of charged ink particles to a laser exposed photoconductor forms the image, which is transferred to a heated blanket prior to final transfer to the substrate. High quality output can be achieved at print speeds consistent with many commercial printing requirements. However, analog offset printing still may be favored for higher volume printing jobs.

Inkjet printers are now common and affordable and allow one to obtain photographic quality albeit at low printing speed. They are used in home printing, office printing and more recently, in commercial printing. Key advantages for inkjet technology in the commercial printing market are that printing width can be easily scaled and high print speeds have been achieved. Challenges facing traditional inkjet technology include a limited substrate gamut and high energy cost for removal of carrier fluid from water-based inks Carrier fluid removal can limit print speed and areal coverage.

Commercial printed media including, but not limited to, packaging cartons and boxes, envelopes, magazines, and brochures, for example, that are printed with logos, image patterns or designs, and a variety of commercial information using any of the above printing technologies, usually have an overcoat varnish to protect underlying print during shipping and handling, for example, as well as provide or enhance gloss. However, adhesive attachment to the overcoat varnish and printing on the overcoat varnish are difficult and present problems when subsequently marking or adding information to the varnish-coated printed media, such as recipient address information; or even to assembly the media as a carton from its fold-pattern. Therefore, manufacturers of the commercial printed media have to account for knock out areas in the overcoat varnish to accommodate various client specifications. Accommodation of the knock out areas for various clients is accomplished in ways that can limit the types of overcoat varnish used, and how it is applied, for example; and impact equipment durability and maintenance.

For example, in analog printing, a specific plate or mask is created to accommodate the knock outs for each client's specifications, which is suited for static data. In digital printing, overcoat varnish is applied in the areas where knock outs are not specified. For example, inkjet printing the overcoat using piezoelectric inkjet print heads may be limited to custom designed UV-curable overcoat fluids with low viscosity (and low solids content), where the piezoelectric print head tends to have considerable maintenance. In thermal inkjet printing, the thermal print heads both limit the overcoat to custom designed fluids having very low solids and viscosity and still tend to have considerable maintenance. These limitations in printing processes impact both time and cost for the commercial printed media manufacturer.

BRIEF DESCRIPTION OF THE DRAWINGS

Various features of examples of the principles described herein may be more readily understood with reference to the following detailed description taken in conjunction with the accompanying drawings, where like reference numerals designate like structural elements, and in which.

Figure 1:
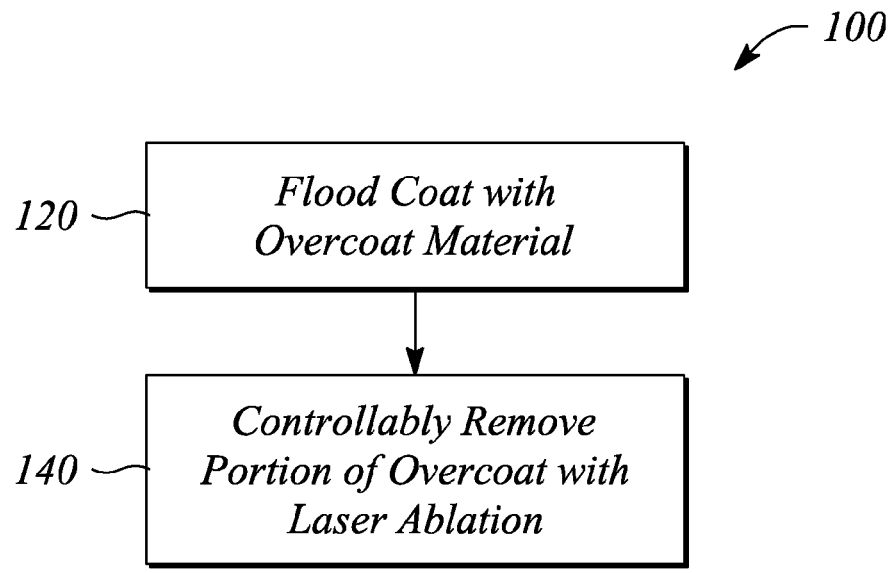
FIG. 1 illustrates a flow chart of a method of providing a pattern in coated printed media according to an example in accordance with the principles described herein.

Certain examples have other features that are one of in addition to and in lieu of the features illustrated in the above-referenced figures. These and other features are detailed below with reference to the preceding drawings.

DETAILED DESCRIPTION

Examples in accordance with the principles herein provide patterning of coated printed media. Methods and a system described herein include flood coating and laser ablation to provide a pattern (e.g., a knock out pattern) in the coated printed media. In particular, a method of providing a pattern in coated printed media includes flood coating an overcoat material on a printed media and controllably removing a portion of the overcoat material in a predetermined region from the flood-coated printed media with laser ablation. In some examples, the laser ablation is provided in-line with the flood coating process. In some examples, the flood coating process and laser ablation are integrated together. Flood coating provides a cost and time effective application process that is relatively indiscriminate to apply a variety of overcoat varnish types (e.g., solvent-based, aqueous-based and UV-curable) to a printed media. Moreover, a digitally controlled laser system can ablate an overcoat to a precise depth, in a precise location, and into a precise area (or shape) to make forming a pattern in a coated printed media completely digital. For example, the laser intensity, dot size, power, repetition rate and number of passes can be used to either completely remove overcoat or generate different patterns and textures in the overcoat in predetermined regions on the fly for each client's specifications. Moreover, in some examples, one or both of flood coating and laser ablation may be included with the various printing technologies used to print images on media.

According to various examples of the principles herein, a variety of different client specifications may be accommodated, often at relatively low cost, using this digitally controlled subtractive process (i.e., laser ablation) to form knock out patterns in a blanket coating of overcoat varnish applied to printed media. For example, the digitally controlled subtractive process can change knock out specifications on the fly. Moreover, this blanket coating process (i.e., flood coating) used to apply the overcoat varnish does not discriminate or limit the types of overcoat varnish that can be used or where it is applied on the surface of the printed media, for example. In particular, special plates and masks, custom designed overcoat varnishes, and considerable equipment maintenance may be avoided by using the flood coating. Moreover, the processes can be made compatible with inkjet, DEP, LEP and various analog printing technologies, such as offset printing, according to some examples.

In some examples, the laser ablation and the flood coating are integrated with printing to provide a method of printing and a printing system in accordance with the principles described herein. In particular, a method of printing includes printing an image on a media, then flood coating the printed media with an overcoat material, and laser ablating a portion of the overcoat coating in a predetermined region to provide the pattern in a coated printed media. In some examples, the printing is in-line with the flood coating, which is in-line with the laser ablation. Moreover, in accordance with the principles herein, a printing system includes a print engine to dispense imaging material, a flood coater to dispense overcoat material, a laser to selectively ablate the overcoat, and a controller that is in communication with the print engine, the flood coater and the laser, which together provide the pattern in coated printed media. In some examples, the printing system provides one or both of an in-line way and an integrated way to print, coat and pattern various media. The method of patterning and the printing method and system described herein provide a fully digitally way to meet client or customer specifications for printing, packaging and marking, for example.

Moreover, in some examples, a detector may be employed in the printing system to monitor gloss within the ablated region one or both of during and following the laser ablation. In some examples, feedback control may be used to control the laser ablation and the detector may be included in a feedback control loop with the controller, for example. In some examples, the printing system further includes the detector and a feedback loop. In some examples, the method of printing further includes determining a level of gloss in the ablated region.

The ablated predetermined region created by the laser ablation may provide accessibility to the printed media surface for further processing, for example to subsequently print information, such as a name and addresses or a logo; or to subsequently apply adhesive, such as for assembling printed cartons or boxes, or later sealing printed cartons or boxes, or for adhering labels, for example. The ablated predetermined region may also provide areas of one or both of modified gloss (i.e., spot gloss) and texture to the coated printed media. The texture may also provide sufficient surface roughness to facilitate adhesion by improving bond strength between an adhesive and the printed media. Flood coating techniques used to coat the printed media with overcoat material may improve product throughput and may lower cost by being able to use a variety of different overcoat materials (including those with high solids content) and decrease equipment maintenance. Laser ablation provides a digitally controllable way of removing the overcoat in the predetermined regions on the fly. The laser can be calibrated to ablate the predetermined region to a predetermined depth that leaves the underlying printed media surface substantially intact.

As used herein, the article 'a' is intended to have its ordinary meaning in the patent arts, namely 'one or more'. For example, 'a region' means one or more regions and as such, 'the region' explicitly means 'the region(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within normal tolerances of a measurement technique or equipment used, unless otherwise expressly specified. In some examples, 'about' means plus or minus 20%, or plus or minus 10%, or plus or minus 5%. Any ranges of values provided herein include values and ranges within or between the provided ranges. The term 'substantially' as used herein means a majority, or almost all, for example, and in some examples, 'substantially' means all. Moreover, examples herein are intended to be illustrative only and are presented for discussion purposes and not by way of limitation.

The term 'in-line' is defined as being sequential, or for example, without substantial interruption, with respect to a process flow or with respect to equipment combined together.

The term 'integrated' is defined as a type of combination where separate elements are adapted or configured to be coordinated together and controlled by a common source, so as to provide cooperative, interrelated, and uninterrupted functions that are otherwise interrupted in one or both of time and space without integration.

The term 'flood coating' is defined as a process wherein a material is indiscriminatingly applied over an entire surface of a media.

The term 'media' is defined as a substrate that includes, or in some examples is, an image receiving material. Media may be in the form of a web, a sheet, or a roll, for example. By 'image receiving material', it is meant a material or a composition that has one or both of good affinity for and good compatibility with an imaging material that is applied to the image receiving material. By 'imaging material', it is meant a composition that includes pigment colorants or dye colorants that in some examples is dispersed in water, a solvent or another vehicle, wherein the colorants are used to form images on the media by printing, for example. The term 'printed media' is defined as the media having an image formed on a surface of the media using imaging materials and printing techniques. The term 'coated printed media' is defined as the printed media having a hardened overcoat (i.e., 'coating') of an overcoat material or varnish on a surface of the printed media.

The term 'predetermined region' is defined as an area that is identified for a change prior to changing the area. The area has predetermined dimensions (e.g., length, width, depth), a predetermined location (e.g., x, y, z coordinates in a Cartesian coordinate system), and a predetermined shape (e.g., circular, elliptical, irregular, triangular, square, rectangular or other multi-sided shape), for example. Moreover, one or both of the predetermined dimensions and predetermined shape may vary in portions of the area that define the predetermined region.

The term 'pattern' is defined as a predetermined interruption formed in a surface of a coated printed media. For example, a pattern includes, but is not limited to, predetermined regions of surface roughness on a relatively smooth surface; predetermined regions of voids or holes through a relatively continuous surface; predetermined regions of indentations in a relatively constant-thickness surface, or a combination of two or more of the above (e.g., 'knock outs'), wherein the 'surface' is the surface of an overcoat coating on a printed media.

In some examples in accordance with the principles described herein, a method of providing a pattern in coated printed media is provided. FIG. 1 illustrates a flow chart of the method 100 of providing such a pattern according to an example of the principles herein. The method 100 of providing a pattern comprises flood coating 120 a printed media with an overcoat material that subsequently hardens to form an overcoat coating. The overcoat coating one or more of provides protection to a surface of the printed media (e.g., protects an image formed on the media), enhances gloss of the printed media, and provides gloss to the printed media. Concomitantly, the overcoat coating renders the printed media surface substantially inaccessible.

In some examples, equipment for flood coating 120 includes, but is not limited to, blade coaters, rod coaters, knife coaters, reverse roll coaters, transfer roll coaters, gravure coaters, kiss-roll coaters, spray coaters, and curtain coaters. The flood coating 120 equipment is configured to apply a blanket (i.e., substantially continuous) coating of the overcoat material to the print media surface. Various flood coaters may be obtained from Kohler Coating (Uniontown, Ohio), Black Clawson (Fulton, N.Y.), Thermal Engineering Corporation (Columbia, S.C.) and Pyradia (Quebec Canada), for example.

In some examples, the overcoat material is substantially transparent in hardened or cured form, and may include colorant, for example. In general, the overcoat material is classified as being one of a UV-curable polymer, an aqueous-based polymer, and a solvent-based polymer. Examples of UV-curable polymeric overcoat materials include, but are not limited to, Nicoat UV 7035 (Nicoat, Itasca, Ill.), and ACTEGA UV9058DG (ACTEGA WIT Inc., Lincolnton, N.C.). Examples of aqueous-based polymeric overcoat materials include, but are not limited to, Michelman DigiGuard® Gloss 100 (Michelman Inc., Cincinnati, Ohio), and Nicoat 2710H, Nicoat 2710, and Nicoat AQK640G (Nicoat, Itasca, Ill.). The resins of these overcoat materials generally include one or both of styrenic binding systems and acrylic binding systems. Examples of solvent-based polymeric overcoat materials include, but are not limited to, Miraglaze™ overprint varnishes, e.g., Miraglaze™ 7017 from Momentive Specialty Chemicals (Carpentersville, Ill.). Solvent-based overcoat materials generally include vinyl acetate-based, acrylic-based, polyvinyl butyral (PVB)-based or wax-based resins, for example, or oil-based alkyd resins, e.g., similar to lithographic paste ink used in offset printing, but without pigmentation.

Equipment that may be used to harden the overcoat material includes, but is not limited to, one or more of an ultraviolet (UV) lamp, an infra-red (IR) lamp, forced air, and a circulating fan, and depends on the type of overcoat material used. For example, water-based coatings and solvent-based coatings may use a combination of forced air and IR heat to dry the coating; and UV curable coatings may use a UV curing lamp in a range of 200 to 300 Watts/square inch ($W/in^2$) (or about 310 kilo Watts per square meter ($kW/m^2$) to about 465 $kW/m^2$). In some examples, the method 100 of providing a pattern in coated printed media further comprises hardening the overcoat material into the overcoat coating.

The method 100 of providing a pattern further comprises controllably removing 140 a portion of the overcoat coating from the printed media surface in a predetermined region with laser ablation. In some examples, the controlled removal 140 is in-line with the flood coating 120 process. In some examples, controllably removing 140 the overcoat coating using laser ablation comprises using a digitally controlled laser to controllably etch the overcoat coating. In some examples, the laser is a laser engraver where the laser optics moves around in x and y directions of the Cartesian coordinate system to draw vectors with a laser beam on the coated printed media. In some examples, the laser engraver moves along a fine helix with laser pulses on a raster basis. In some examples, the laser engraver is a galvanometric laser where galvo mirrors move the laser beam over the coated printed media or a scanning head laser. In some examples, controllably removing 140 a portion of the overcoat coating comprises evacuating any debris and fumes from the surface of the coated printed media during the laser ablation.

In some examples, the laser has a specific wavelength of energy or specific range of wavelengths of energy for ablation in a controllable manner. In some examples, the laser is one or more of tunable and digitally controllable and programmable to facilitate controllably removing 140 a portion of the overcoat coating in predetermined regions. Moreover, galvanometric lasers may work well in high speed applications, such as equal to or greater than about 400 feet per minute (or about 122 meters per min.), for example. A variety of lasers may be used for laser ablation including, but not limited to, various yttrium aluminum garnet (YAG)-based lasers, rotary engravers, and carbon dioxide ($CO_2$) lasers. For example, a neodymium-doped YAG (Nd:YAG) laser at 1.06 microns wavelength or a $CO_2$ laser at 10.6 microns wavelength may be used. In some examples, the laser is a $CO_2$ laser, for example a galvanometric $CO_2$ laser scanner. $CO_2$ lasers useful for in-line controlled laser ablation of the overcoat coating are available from a variety of laser manufacturers including, but not limited to, GravoGraph (GravoTech Inc., Duluth, Ga.), Rayjet (Trotec Laser Inc., Ypsilanti, Mich.), LaserPro (Grand Prairie, Tex.), and Universal Laser Systems (Scottsdale, Ariz.). In other examples, the laser is a YAG-based laser including, but not limited to, a YAG laser, a Nd:YAG laser, or an erbium-doped YAG (Er:YAG) laser. A variety of YAG-based lasers useful for in-line controlled laser ablation of the overcoat coating are available from CrystaLaser® (Reno, Nev.) and NIDEK Inc. (Fremont, Calif.), for example.

After laser ablation, the printed media surface in the ablated predetermined region remains substantially intact. The ablated predetermined region of the overcoat coating provides the pattern in the coated printed media. The pattern in the coated printed media may be one or both of predetermined areas that are devoid of overcoat coating, i.e., areas where the surface of the print media is exposed, predetermined areas that have surface texture or roughness, and predetermined areas that have recesses in the overcoat coating. As such, the method 100 of providing a pattern provides for further processing of the coated printed media, for example.

In some examples, the portion of the overcoat coating in the predetermined region that is controllably removed 140 is less than all of the overcoat coating in the predetermined region. As such, the coated printed media retains some overcoat coating in the predetermined region. In some examples, the overcoat coating may be texturized to provide surface roughness within the predetermined region. The surface roughness afforded by laser ablation may facilitate adhesion to the coated printed media in the predetermined region. In some examples, the texturized predetermined region provides an area of modified gloss in the overcoat coating. Moreover, the surface roughness may include a recess in the overcoat coating that facilitates further processing.

In some examples, the portion of the overcoat coating that is controllably removed 140 is substantially all of the overcoat material in the predetermined region. In these examples, the ablated predetermined region provides access to the printed media surface. For example, access to the printed media surface that is otherwise coated with the overcoat coating provides for further processing of the printed media surface in the predetermined region. In some examples, another image (e.g., name and address information, or a logo) may be printed on the printed media surface in the ablated predetermined region (i.e., the accessible surface).

Whether the printed media surface is accessible or the overcoat coating is texturized in the ablated predetermined region, in some examples, a label (e.g., an address label) may be adhered to the coated printed media in the ablated predetermined region. In other examples, an adhesive may be applied to the ablated predetermined region to provide a level of bondability or adherability of the coated printed media including, for example, to other objects (e.g., a label) or to other portions (or predetermined regions) of the coated printed media. For example, the coated printed media may be foldable (or assembled by folding) into a carton (e.g., a shipping carton or a gift box) that uses the adhesive in the predetermined regions to adhere the folded carton together. Moreover, other predetermined regions of the foldable carton may facilitate labeling the carton, printing on the carton, or sealing the carton, for example.

Figure 2:
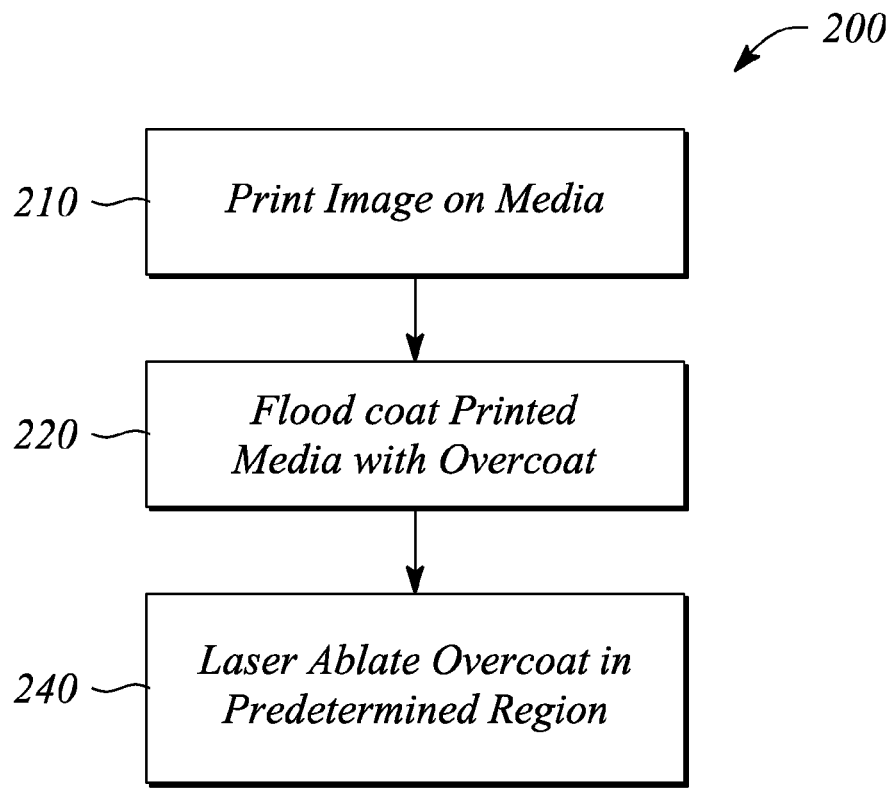
FIG. 2 illustrates a flow chart of a method of printing that provides a patterned coated printed media according to an example in accordance with the principles described herein.

In some examples in accordance with the principles herein, a method of printing to provide a patterned coated printed media is provided. FIG. 2 illustrates a flow chart of a method 200 of printing according to an example of the principles described herein. The method 200 of printing comprises printing 210 an imaging material on a media to form a printed media comprising an image. In some examples, the imaging material is one of an ink, a lithographic paste, and a toner (either dry or liquid). In some examples, printing 210 an imaging material comprises using one of a variety of inkjet-type printers or presses and a variety of analog offset presses to form a printed ink or paste image on the media, respectively. In other examples, printing 210 an imaging material comprises using an EP type printer or press and a respective toner to form a printed image.

The method 200 of printing further comprises flood coating 220 the printed media with an overcoat material to completely cover the image. Flood coating 220 comprises hardening the overcoat material into a coating on a surface of the printed media that covers the image. In some examples, flood coating 220 the printed media is substantially similar to flood coating 120 an overcoat material of the method 100 of providing a pattern in coated printed media, described above.

The method 200 of printing further comprises laser ablating 240 the overcoat coating in a predetermined region to controllably remove a portion of the overcoat coating from the coated printed media to provide a patterned coated printed media. In some examples, laser ablating 240 the overcoat coating is substantially similar to controllably removing 140 a portion of the overcoat coating of the method 100 of providing a pattern in coated printed media, described above.

In some examples, one or more of the overcoat material, the media and the imaging material is doped with a respective wavelength specific absorber or reflector to improve an efficiency or specificity of the laser ablation 240 of the overcoat. The wavelength-specific agents enhance the receptiveness of the overcoat material to particular laser wavelengths and facilitate the ablation specificity of a laser. Examples of wavelength-specific absorbing agents useful for the overcoat material include, but are not limited to, dyes, such as those available from Mobitec Corporation (Germany), SongSorb® 1000PW (290-400 nm) water-based UV absorber and Songsorb® 8100PW (240-340 nm) absorber from Songwon Industrial Co., Ltd. (Korea), or a variety of absorber materials from Ciba (BASF Schweiz AG, Switzerland), for example.

Moreover, in some examples, the laser ablation 240 of the overcoat coating comprises varying an ablation depth in the predetermined region to provide a texture to the overcoat coating. The provided texture may include, but is not limited to, one or more of an area of modified gloss, an area of surface roughness, and a recess in the overcoat coating, for example. In some examples, the ablated 240 predetermined region of the overcoat coating provides accessibility to the image surface of the printed media.

In accordance with an example of the principles herein, the printing 210, the flood coating 220, and the laser ablation 240 to provide the patterned coated printed media of the method 200 of printing are all performed in-line by a single printing system. For example, the printing system may use either direct-to-media printing technology or offset printing technology. Moreover, whether the image surface of the patterned coated printed media is rendered accessible or the overcoat coating surface is modified, as described above during laser ablation 240, the patterned coated printed media is available for one or more of subsequently printing another imaging material, applying an adhesive, and applying a label on the ablated predetermined region, depending on the examples. Moreover, in some examples, the same printing system may be used for one or both of the subsequent printing of imaging materials and application of adhesives to the ablated predetermined region.

Figure 3:
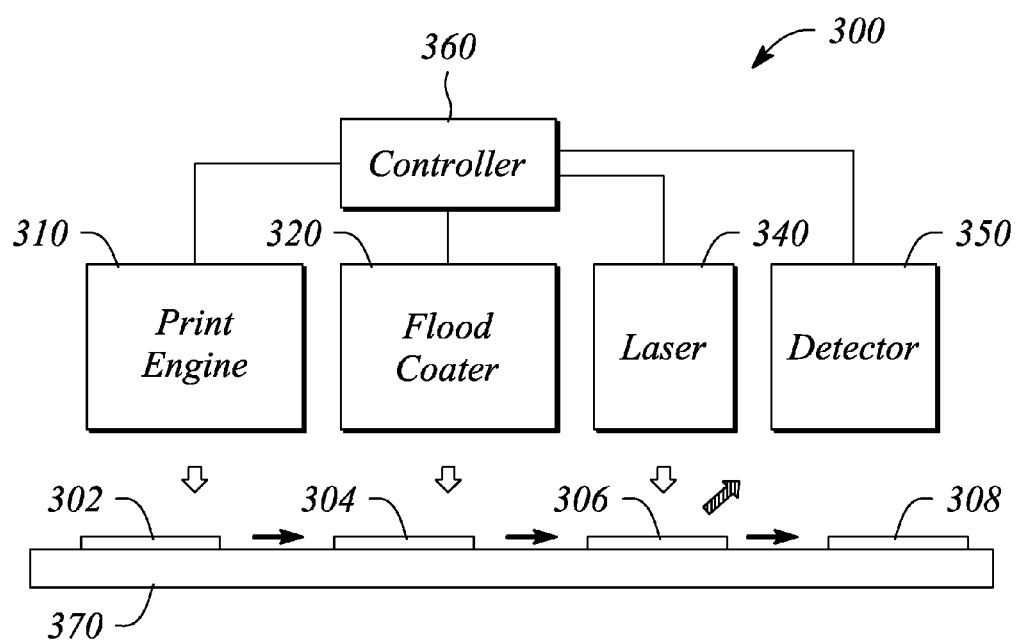
FIG. 3 illustrates a block diagram of a printing system according to an example in accordance with the principles described herein.

In some examples in accordance with the principles herein, a printing system to produce a patterned coated printed media is provided. FIG. 3 illustrates a block diagram of a printing system 300 according to an example of the principles described herein. In some examples, the printing system 300 includes, but is not limited to, a printer, a web press, or a sheet press, that uses either direct-to-media printing technology or offset printing technology. In some examples, the printing system 300 provides one or both of an in-line means and an integrated means for producing the patterned coated printed media.

The printing system 300 comprises a print engine 310. In some examples, the print engine 310 is an inkjet engine (either piezoelectric or thermal) that comprises an inkjet print head that includes a plurality of nozzles for dispensing inkjet ink. In other examples, the print engine 310 is a DEP print engine, a LEP print engine or an analog offset print engine.

The printing system 300 further comprises a flood coater 320. In some examples, the flood coater 320 is substantially similar to the flood coaters described above for flood coating 120, 220 of the methods 100 and 200. The flood coater 320 is compatible with a variety of overcoat materials including, but not limited to, aqueous-based polymers, solvent-based polymers and ultraviolet-curable polymers, for example. In some examples, the printing system 300 further comprises means for hardening or curing the overcoat material (not illustrated) dispensed by the flood coater 320. In some examples, the means for hardening or curing the overcoat material is included as a part of the flood coater 320. The hardening or curing means may include, but is not limited to, one or more of a co-dispensed hardening agent, forced air, an IR heat lamp (for aqueous coatings and solvent coatings), and a UV lamp (for UV-curable coatings).

The printing system 300 further comprises a laser 340. In particular, the laser 340 is of a type in which laser intensity, dot size, power, repetition rate and passes, for example, are accurately adjustable and digitally controllable to precisely control ablation depth, ablation location and ablation area on the fly. In some examples, the laser 340 is a $CO_2$ laser, for example a galvanometric $CO_2$ laser or laser scanner. In other examples, the laser is a YAG-based laser or another type of laser. In some examples, the laser 340 is digitally controllable to one or more of completely remove, partially remove, generate different patterns in, and generate different textures in a surface. In some examples, the laser 340 is one of a variety of laser types described above for controllably removing 140 and laser ablating 240 of the methods 100 and 200, respectively.

In some examples, the printing apparatus 300 further comprises a detector 350 to determine (e.g., measure or monitor) a level of gloss in the ablated regions either during or after laser ablation. In some examples, the detector 350 is employed to determine a change in the level of gloss. In some examples, the detector 350 determines either a level of gloss or a change in the level of gloss using the laser 340 as an illumination source. In other examples, an illumination source (not illustrated) other than the laser 340 is employed for gloss measurement or determination. For example, the detector 340 and the illumination source may be included in a glossmeter used to measure the gloss during or after laser ablation. In some examples, the detector 350 is connected to provide feedback regarding the status or the condition of the ablated region (i.e., the gloss level) in a feedback loop. In particular, the detector 350 may be included in a feedback control loop used to control the laser 340 during laser ablation. In some examples, paper industry TAPPI methods may be used to either measure the gloss level or to calibrate an indirect determination of the gloss level (e.g., when using the laser 340 as the illumination source).

The printing system 300 further comprises a controller 360 in communication with the print engine 310, the flood coater 320, the laser 340, and the detector 350 (when present). The controller 360 comprises a microprocessor, memory and a computer program stored in the memory. The computer program comprises instructions that are executed by the controller 360. When executed by the controller 360, the instructions implement printing of an imaging material from the print engine 310 onto a surface of a media 302 to form a printed media 304 comprising an image. The instructions further implement flood coating of an overcoat material from the flood coater 320 on a surface of the printed media to form a coated printed media 306. The instructions further implement laser ablating the overcoat with the laser 340 to controllably remove a portion of the overcoat in a predetermined region from the coated printed media to provide a patterned coated printed media 308. In some examples, the instructions that implement laser ablation of the overcoat further comprise providing feedback to the controller 360 regarding a level of gloss in the predetermined region in real time in a feedback loop using the detector 350. In other examples, the instructions further implement measuring with the detector 350 a level of gloss (including a change in gloss level) in the predetermined region either during or after laser ablation. Moreover, the controller 360 is programmable to change one or both of an image pattern from the print engine 310 and a laser ablation pattern from the laser 340 on the fly.

In some examples, one or more of the print engine 310, the flood coater 320, and the laser 340 that are respectively controlled by the controller 360 are also in-line in the printing system 300. In some examples of the printing system 300, the print engine 310, the flood coater 320, the laser 340 and the detector 350 are integrated together under the control of the controller 360. In some examples, the printing system 300 further comprises means 370 for moving the media from an inlet to the printing system 300 to an outlet of the printing system 300. The controller 360 is further in communication with the means 370 of moving or the 'media feed 370'. In some examples, the instructions stored in memory of the controller 360 further implement moving the media 302 in alignment with the print engine 310 to receive the imaging material; moving the printed media 304 in alignment with the flood coater 320 to receive a blanket coating of the overcoat material; and moving the coated printed media 306 in alignment with the laser 340 for ablation of the overcoat coating into a pattern before the patterned coated printed media 308 exits the printing system 300 at the output, for example. In some examples, the printing system 300 further comprises an adhesive dispenser to apply an adhesive to a predetermined region formed by ablation with the laser 340. In some examples, the printing system 300 further comprises a label dispenser to apply a label to a predetermined region formed by ablation with the laser 340. In some examples, the media feed 370 returns the patterned coated printed media 308 to the print engine 310 where the patterned coated printed media 308 receives another image in a predetermined region formed by ablation with the laser 340.

The media 302 includes, but is not limited to, paper, cardboard, pressboard, plastic, other polymer-based substrates, cloth, other cellulose-based substrates, and plastic-coated cellulose-based substrates, for example. While FIG. 3 illustrates the media 302 in a sheet or discrete form, the media 302 may be in the form of a sheet, a web, or a roll, for example. The printing system 300 may be one or more of a web press, a sheet press, a direct-to-media press, an offset press, a digital press, and an analog press, for example. Moreover, the printing system 300 may be used in commercial or industrial printing applications, including high speed printing applications.

In some examples, the media 302 may be a packaging material (e.g., cardboard or Tyvek®) that can fold upon itself to form a carton or envelope (Tyvek® is a registered trademark of E. I. du Pont de Nemours and Company for a flash-spun, high-density polyethylene fiber material). In these examples, some of the predetermined regions that are ablated by the laser 340 provide areas where the packaging material fastens together after folding to form the carton or envelope; another of the predetermined regions provide a location for address information on the carton or envelope; and still another of the predetermined regions provide a location for subsequent sealing the carton or the envelope.

In some examples, the media 302 may be magazine or brochure stock. In these examples, after printing with the printing system 300, the predetermined region of the patterned coated printed media 308 provides an area on a cover page of the magazine or brochure for adding identifying indicia. For example, one or more of a name and address, a company logo, and other indicia may be added in the predetermined region formed by ablation with the laser 340.

While other digital processes can apply or jet overcoat material in specific locations, these other processes are one or both of generally slow and have restrictions on fluid viscosity or percent solids content, for example. In flood coating followed by laser ablation according to the examples of the principles described herein, the overcoat material can be any polymeric coating material (aqueous, solvent or UV-based) applied using a substantially indiscriminate blanket coating process. Since a non-jetting process is involved to apply the overcoat material, no issues arise with print head reliability and replacement due to the overcoat application. Moreover, using a subtractive process of laser ablation or etching, for example with a galvanometric type laser, provides high speed, digitally controllable laser ablation with readily changeable patterns and pattern dimensions.

EXAMPLES

Example 1

Sterling® Ultra Gloss (SUG) paper media from NewPage Corporation (Miamisburg, Ohio) were coated with between 2 and 10 microns of Nicoat 2710H (aqueous-based, 40% solids) overcoat material (from Nicoat, Ill.) using coating rods, No. 4 and No. 10, from R.D. Specialties, Inc. (Webster, N.Y.). The coated media were ablated using various $CO_2$ lasers and parameters listed in Table 1, where 'cm per sec' means centimeters per second. The power was modulated on and off, such that the underlying media surface was not burned and therefore, remained intact.

Example 2

Sterling Ultra Gloss (SUG) media were printed with an image using inkjet ink and then were coated with between 2 and 10 microns of the Nicoat 2710H (aqueous-based, 40% solids) overcoat material, as in Example 1. The coated media (in unprinted areas) were ablated using the $CO_2$ lasers and parameters listed in Table 1. The depth of penetration was modulated by adjusting laser power. The underlying media surface was not burned and therefore, remained intact.

TABLE 1

| Vendor | Laser Power (Watts) | Percent (%) Power Used | Scanning Speed (cm per sec) |
|---|---|---|---|
| GravoGraph | 30 | 7 to 10 | 254 |
| LaserPro | 40 | 10 | 203 |
| Universal | 60 | 4 | 165 |

Figure 4:
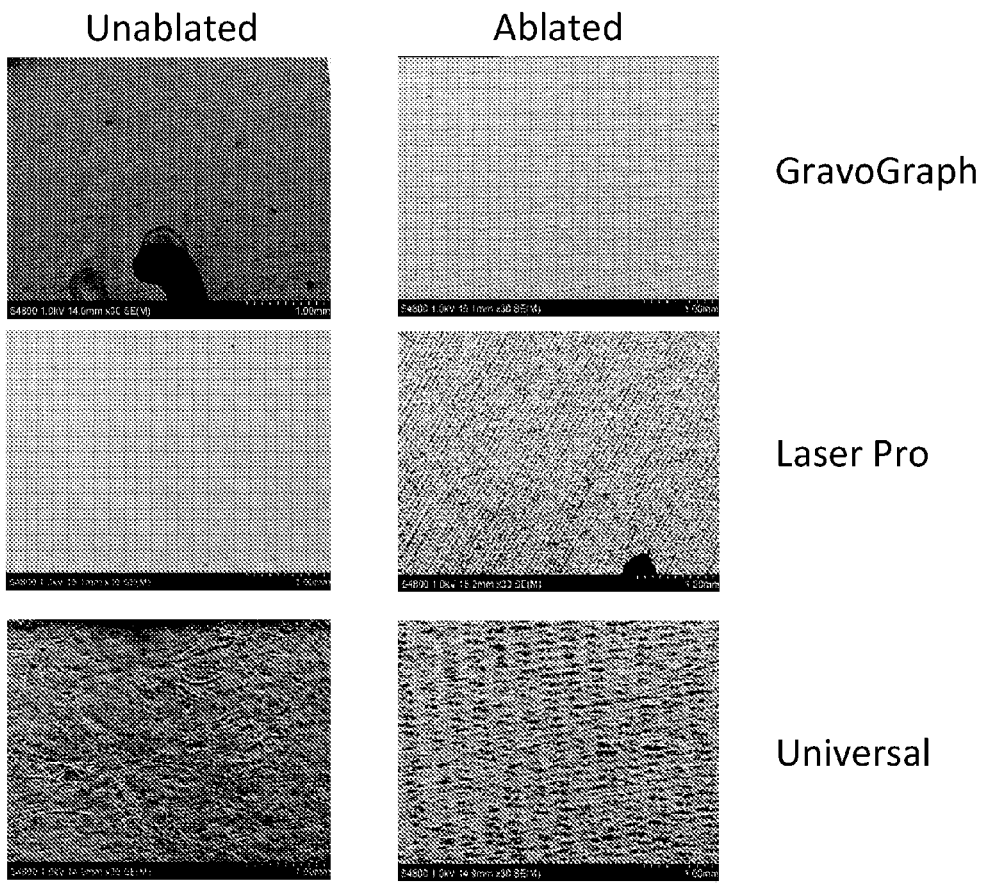
FIG. 4 illustrates comparison micrographs of ablated and unablated coated media according to examples in accordance with the principles described herein.

FIG. 4 illustrates micrographs of results obtained from ablating the coated media of Examples 1 and 2 in accordance with examples of the principles described herein. The ablated coated media are provided on the right hand side and corresponding unablated coated media are provided on the left hand side of FIG. 4 as a comparison. The three sets of comparison micrographs represent the results for the three lasers and parameters listed in Table 1. The micrographs show that the ablated coated media had a textured surface and was no longer smooth relative to the unablated coated media, but the paper media surface appeared intact after ablation.

Figure 5A:
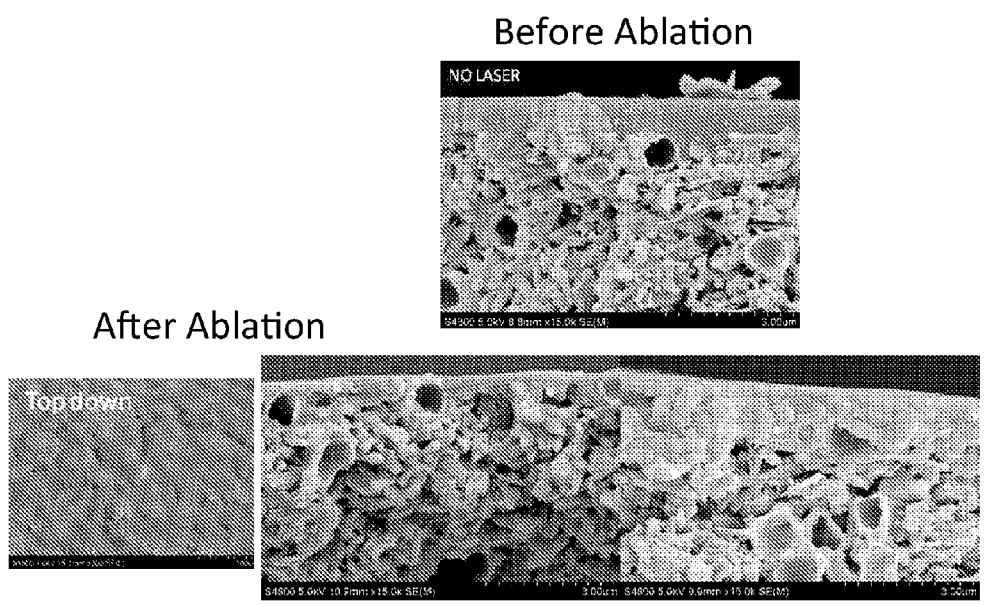
FIGS. 5A-5C illustrate SEM photographs of top views and cross-sectional views of coated media before and after laser ablation according to examples in accordance with the principles described herein.
Figure 5B:
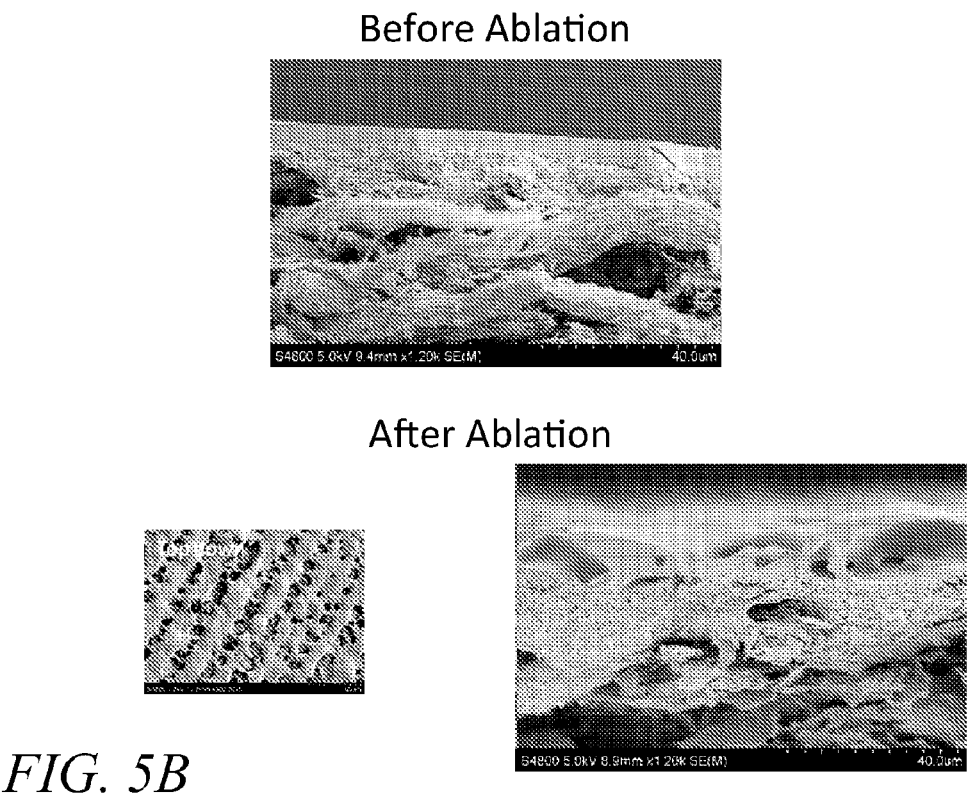
Figure 5C:
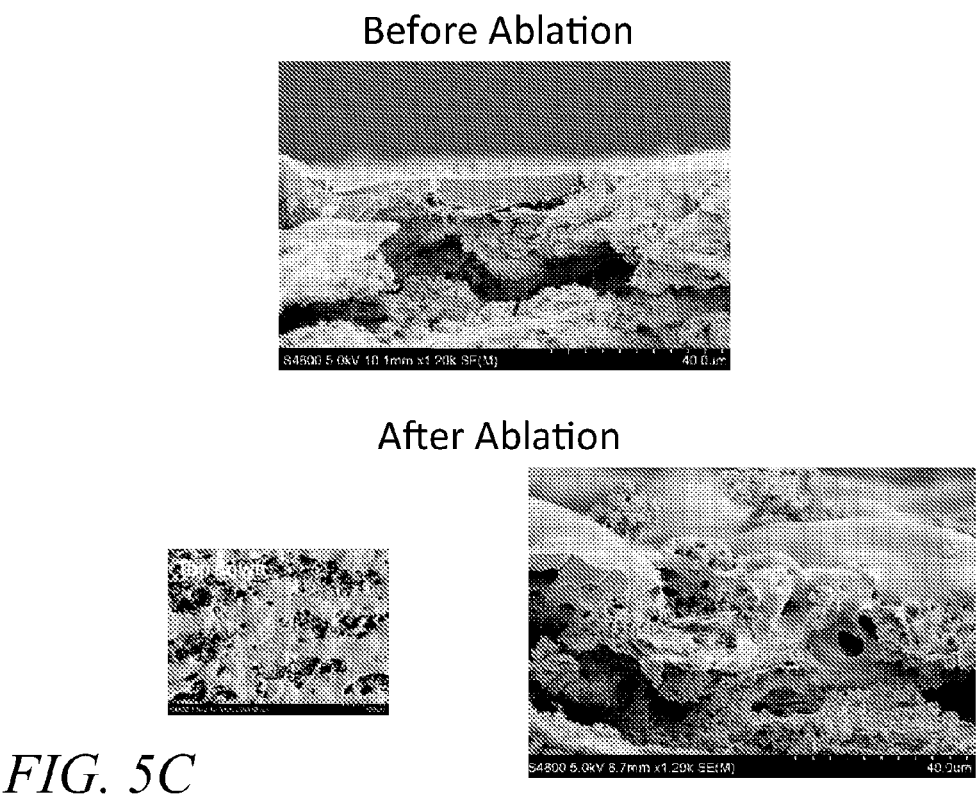

FIGS. 5A-5C illustrate SEM photographs of top views and cross-sectional views of the coated media of Examples 1 and 2 for the lasers and parameters in Table 1 in accordance with examples of the principles described herein. In particular, the cross-sectional views illustrate a relatively continuous or solid layer of the overcoat coating on the paper media before ablation that has a relatively smooth surface. After ablation, the overcoat coating is substantially removed, and the paper media surface appeared intact after ablation from both the cross-sectional view and the top view. FIG. 5A illustrates the results for the GravoGraph laser at two different % power used within the 7-10% range (of Table 1) for a comparison; FIG. 5B illustrates the results for the LaserPro laser; and FIG. 5C illustrates the results for the Universal laser, each of which is listed in Table 1.

$CO_2$ lasers were used in the Examples herein due to their relative availability for these experiments; however their use is not intended as a limitation to the scope of the examples in accordance to the principles described herein. Various other lasers including, but not limited to, YAG-based lasers, are also within the scope of the principles described herein.

Thus, there have been described examples of a method of printing and a printing system that employ a method of providing a pattern in coated printed media. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A method of providing a pattern in coated printed media, the method comprising:
    flood coating a printed media with an overcoat material that hardens to form an overcoat coating, the printed media having an image printed on a surface of a media selected from paper, cardboard, pressboard, cloth, another cellulose-based material and a packaging material; and
    controllably removing a portion of the overcoat coating from the printed media in a predetermined region with laser ablation, the printed media in the ablated predetermined region remaining substantially intact, the ablated predetermined region providing the pattern in the coated printed media.

2. The method of claim 1, wherein controllably removing a portion of the overcoat coating comprises removing substantially all of the overcoat coating in the predetermined region to access a surface of the printed media.

3. The method of claim 2, further comprising printing information on the accessible printed media surface in the predetermined region.

4. The method of claim 1, further comprising adhering a label to the ablated predetermined region.

5. The method of claim 1, further comprising applying adhesive to the ablated predetermined region.

6. The method of claim 1, wherein controllably removing a portion of the overcoat coating comprises removing an amount of the overcoat coating to modify the gloss in the predetermined region.

7. The method of claim 1, wherein controllably removing a portion of the overcoat coating comprises texturizing the overcoat coating in the predetermined region.

8. The method of claim 1, further comprising doping the overcoat material with a wavelength specific absorber to improve laser ablation efficiency.

9. A method of printing comprising:
printing an imaging material on a media to form a printed media comprising an image;
flood coating the printed media with an overcoat material to cover the image, the overcoat material hardening into an overcoat coating; and
laser ablating the overcoat coating in a predetermined region to controllably remove a portion of the overcoat coating to provide a patterned coated printed media, wherein the printed media in the ablated region remains substantially intact.

10. The method of claim 9, further comprising determining a level of gloss in the laser ablated predetermined region one or both of during and after the laser ablating.

11. The method of claim 9, further comprising subsequently printing another imaging material on the ablated predetermined region.

12. The method of claim 9, further comprising applying one of an adhesive and an adhesive label to the ablated predetermined region.

13. The method of claim 9, wherein laser ablating the overcoat coating comprises varying an ablation depth in the predetermined region to provide one or both of a texture to the overcoat coating and an area of modified gloss.

14. The method of claim 9, wherein the ablated predetermined region provides accessibility to a surface of the printed media.

15. The method of claim 9, wherein the printing, the flood coating and the laser ablation are all performed in-line by a printing system, the printing system using either direct-to-media printing or offset printing.

16. A printing system comprising:
a print engine to print an imaging material;
a flood coater to apply an overcoat material;
a laser; and
a controller in communication with the print engine, the flood coater, and the laser, the controller comprising instructions that, when executed by the controller, implement printing the imaging material on a media to form a printed media, flood coating the overcoat material on the printed media to form an overcoat coating on the printed media, and laser ablating the overcoat coating in a predetermined region of the coated printed media to controllably remove a portion of the overcoat coating to provide a pattern to the coated printed media, wherein the printed media in the ablated region remains substantially intact.

17. The printing system of claim 16, further comprising a detector in a feedback loop with the controller to one or both of determine a level of gloss in the ablated predetermined region and facilitate control of the laser during the laser ablating.

18. The printing system of claim 16, further comprising means for moving the media from an inlet of the printing system, in line with each of the print engine, the flood coater and the laser, and to an outlet of the printing system, the means for moving being under the control of the controller.

19. The printing system of claim 16, wherein the laser is a galvanometric laser.

20. The printing system of claim 16, wherein the flood coater comprises a rod coater.

* * * * *